Sept. 15, 1925.
E. MARTENS
1,554,110
CLEANING ATTACHMENT FOR CORN PLANTER RUNNERS
Filed June 27, 1922
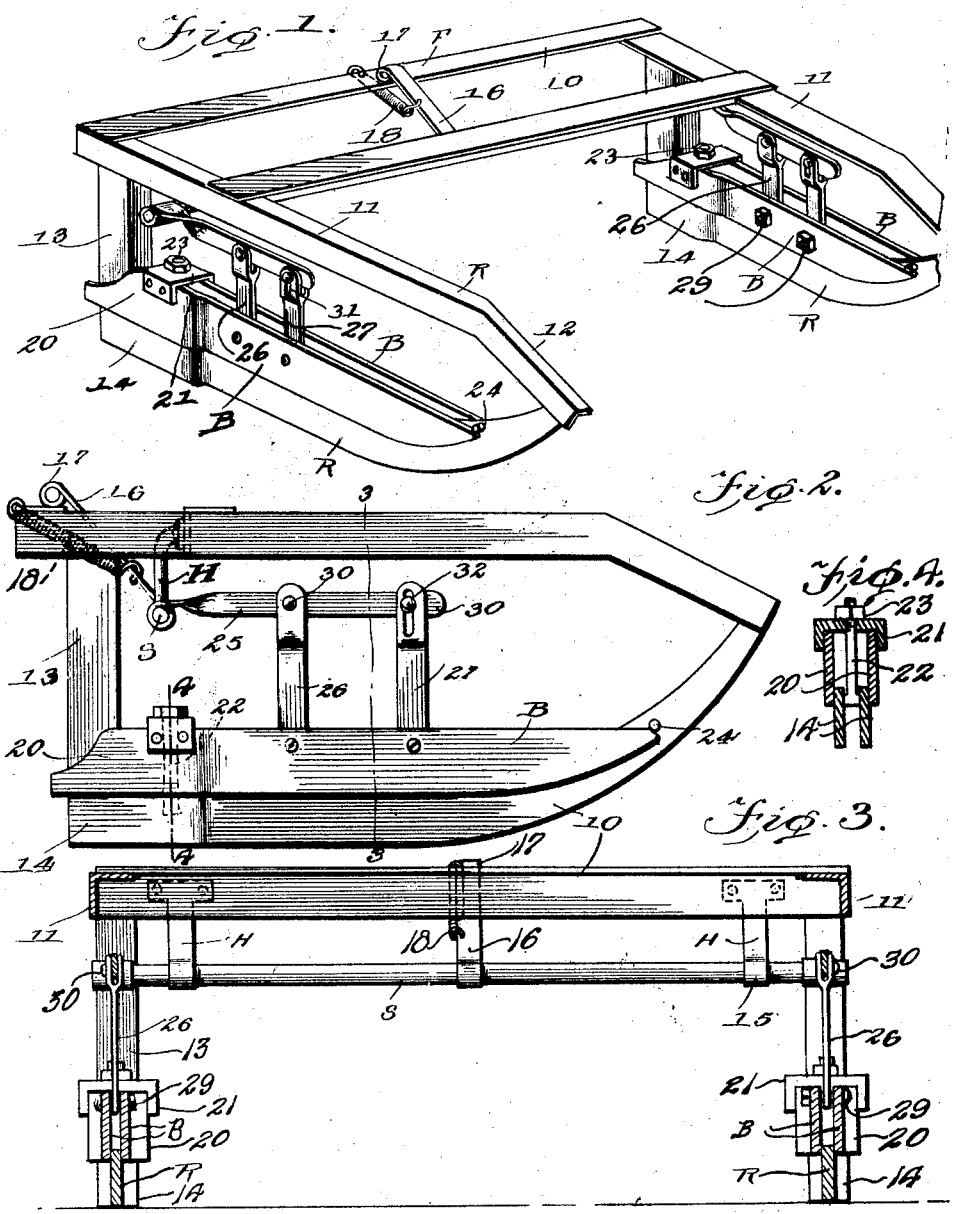
WITNESS
INVENTOR
Emil Martens,
BY
ATTORNEYS Patented Sept. 15, 1925.

1,554,110

UNITED STATES PATENT OFFICE.

EMIL MARTENS, OF FORT DODGE, IOWA.

CLEANING ATTACHMENT FOR CORN-PLANTER RUNNERS.

Application filed June 27, 1922. Serial No. 571,215.

*To all whom it may concern:*

Be it known that I, EMIL MARTENS, a citizen of the United States, and a resident of Fort Dodge, in the county of Webster and State of Iowa, have invented certain new and useful Improvements in Cleaning Attachments for Corn-Planter Runners, of which the following is a specification.

This invention relates to an attachment for corn planter runners.

The invention more particularly relates to a cleaning attachment for corn planter runners or shoes.

As is well known dirt adheres to the shoe or runner of the corn planter and with the result that the runner makes a furrow of a greater width than necessary and also the furrow is ragged or uneven.

The present invention has for its object to provide a cleaner attachment for runners or shoes of corn planters, or runners of similar implements which may be operated while the implement is in operation for cleaning runners in a thorough manner.

It is also an important object of the invention that the attachment be adapted to be operated by the driver of the implement with which the same may be associated.

Other objects will hereinafter appear.

The invention is illustrated by way of example in the accompanying drawings, in which:—

Figure 1 is a perspective view of a corn planter frame and a pair of runners supported thereby and showing the present invention applied.

Figure 2 is a side elevation of the same.

Figure 3 is a transverse sectional view taken substantially on the line 3—3 of Figure 1.

Figure 4 is a transverse vertical section showing the connection of the stud with the planter shoe.

Referring to the drawings more particularly, the frame F may consist in a pair of cross members 10 and the two longitudinally extending members 11, one occurring at each side of the frame F, and the cross members 10 extending between the rear ends thereof. The forward end portions 12 of the side members 11 extends downwardly as shown, and to this end of the frame member there is secured, in each instance, the forward end of a runner or shoe R, the rear end of said runner being in turn secured to a spacing post or casing 13 which extends downwardly from the frame F.

The runners R curve upwardly, as is usual, and the rear end of each runner is provided with an enlargement or heel 14. It is to be understood that the present frame and the form of runners are only shown for the purpose of illustrating the application of the present invention and that the invention is not limited in use to this particular construction.

From the foremost frame member 10 there depends a plurality of hanger straps H, each terminating in an eye 15 adapted to journal the shaft S. The shaft S extends the entire width of the frame F, and at a point intermediate its ends there is secured the one end of a bar or strap 16 which terminates at its free end in an eye 17 which bar may rest upon the rear frame member 10. A coiled spring 18 has its one end secured to the strap 16 and the other end of said coiled spring is secured to the rearmost frame member 10. The bar 16 serves as a connecting medium whereby the shaft S may be rotated from any position on the planter, and the spring 18 serves to yieldingly hold the shaft S in a predetermined position with relation to its rotative movement.

For each runner R there is provided a pair of scraping blades B, each blade consisting in a strip of metal having its lower edge similar in curvature to the lower edge of the runners R, and also each blade being provided with an offset portion 20 adapted to slide upon the heel portion 14 of the associated runner. The lower edge of each scraper blade B is bevelled so that it may serve its function of removing the earth which may adhere to the runner R upon which it operates. The rear end of each pair of blades B are secured together by a channel clip 21 and this channel clip holds the blades in suitable spaced relation so that they may scrape the runner R with which they are associated.

From each heel portion 14 there is extended upwardly a pin 22 (shown in broken lines Fig. 2) which extends through an opening in the bridge portion of the associated channel clip 21, and upon the upper end of each stud 22 there is threaded a nut 23. The purpose of the stud 22 and nuts 23 is to serve as a guide post for the scraper blades B and also to limit the upward movement of the rear ends of these blades. The upward movement of the forward ends of each pair of blades is limited by pins 24.

From each end of the shaft S there is extended forwardly an arm 25. This arm is in each instance rigidly secured to the shaft and is connected to the associated pair of blades B by the means of links 26 and 27 and bolts or the like as at 29, 30 and 32. The upper end of links 26 and 27 is bifurcated and pivotally connected to the arm 25 as at 30 and 32. The link 27 is in each instance pivotally connected at its lower end to the associated scraping blades B, and its upper end is bifurcated and the prongs so provided being slotted as at 31, and through the slots 31 there extends a pin 32 carried by the arm 25, thus providing a lost motion connection between the arm and this link.

In the operation of the present device, when it is desired to clean the runners R the shaft S is rotated through the bar 16 so that the arms 25 will be swung downwardly. With this occurring the blades B will move downwardly scraping the opposite faces of the runners R and removing all earth which may have adhered thereto. The downward movement of the blades B is sufficient to duly clean the runners R. Upon the operator releasing the bar 16 the spring 18 will return the blades B to their normal raised position in an obvious manner.

During the movement of each of the pair of scraping blades B, said blades will remain disposed in a horizontal plane at all times due to the particular arrangement of supporting said blades.

While I have shown and described the preferred form of my invention, I wish it to be understood that I am aware of the fact that the construction, combination and arrangement of parts may be changed by those skilled in the art without departing from the spirit of the invention, as indicated by the appended claims.

I claim:—

1. In combination, a runner of the character described, a pair of blades, one upon each side of the runner and each blade having scraping engagement with the associated face of the runner, a clip transversely connecting said blades, and straddling the upper longitudinal edge of the runner, means for normally and yieldably maintaining the blades in inoperative position, and means for simultaneously moving the blades downwardly for cleaning said runners.

2. In combination with a runner of a vehicle of the character described, a pair of blades disposed longitudinally of the runner and adapted to scrapingly engage the side faces of the runner, a perforated bridge clip connecting member between the said blades, a guide post carried by the runner and adapted to extend through the perforation in said bridge clip, a rockable shaft carried by the vehicle, an arm extending from said shaft, and connecting means between said arm and the blades whereby said blades may be moved downwardly for cleaning said runner.

3. In a vehicle of the character described, a runner having a heel, a pair of blades arranged longitudinally of the runner one on each side thereof, and each blade adapted to scrapingly engage the associated side face of the runner, a perforated bridging connection associated with the rear ends of said blades, means for normally and yieldably maintaining the blades in inoperative position, a guide pin extending upwardly from the heel of the runner and extending through the perforation of said bridging connection, a head on said pin, disposed above said bridging connection adapted to limit the upward movement of the rear ends of said blades when forced to their inoperative position, laterally projecting stops carried by the runner adjacent its front end and adapted to limit the upward movement of the front ends of said blades, a rockable shaft carried by the vehicle, and connecting means between said shaft and blades whereby the blades may be moved downwardly to clean the runner.

EMIL MARTENS.